(12) United States Patent
Barnes et al.

(10) Patent No.: US 7,494,226 B2
(45) Date of Patent: Feb. 24, 2009

(54) METHODS AND APPARATUS FOR CONTROLLING PROJECTORS

(75) Inventors: Ted W. Barnes, Corvallis, OR (US); David C. Collins, Philomath, OR (US); Olan C. Way, Eugene, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 570 days.

(21) Appl. No.: 11/231,455

(22) Filed: Sep. 21, 2005

(65) Prior Publication Data

US 2007/0064300 A1   Mar. 22, 2007

(51) Int. Cl.
G03B 21/28 (2006.01)

(52) U.S. Cl. .......................... 353/50; 353/98; 353/121; 348/771

(58) Field of Classification Search .................. 353/15, 353/98, 99, 122, 121, 46, 50, 51; 359/291, 359/292, 199, 197, 198, 212, 223; 348/771
See application file for complete search history.

(56) References Cited

U.S. PATENT DOCUMENTS

| | | | |
|---|---|---|---|
| 4,814,800 A * | 3/1989 | Lavinsky et al. ............... 353/50 |
| 4,831,449 A | 5/1989 | Kimura | |
| 4,948,971 A | 8/1990 | Vogen et al. | |
| 5,049,745 A | 9/1991 | Vogen et al. | |
| 6,067,362 A | 5/2000 | Lemanski et al. | |
| 6,091,461 A | 7/2000 | Bardmesser | |
| 6,558,003 B2 * | 5/2003 | Mihara ......................... 353/52 |
| 6,817,722 B1 * | 11/2004 | Cole et al. .................... 353/69 |
| 6,843,576 B2 | 1/2005 | Blakley | |
| 6,891,657 B2 * | 5/2005 | Hewlett et al. ............... 359/291 |
| 2003/0218953 A1 | 11/2003 | Park et al. | |
| 2004/0239898 A1 | 12/2004 | Basey | |
| 2005/0083486 A1 * | 4/2005 | Johnson ........................ 353/15 |
| 2006/0043254 A1 * | 3/2006 | Wang et al. .................. 248/550 |
| 2007/0076171 A1 * | 4/2007 | Fasen et al. ................... 353/30 |
| 2008/0143969 A1 * | 6/2008 | Aufranc et al. ................ 353/30 |
| 2008/0239252 A1 * | 10/2008 | Konno et al. .................. 353/98 |

* cited by examiner

*Primary Examiner*—William C Dowling (57) ABSTRACT

An optical component of a projector is driven with a signal that contains one or more components that act to substantially cancel one or more unwanted oscillatory displacements of the optical component resulting from one or more unwanted oscillatory forces.

31 Claims, 6 Drawing Sheets

METHODS AND APPARATUS FOR CONTROLLING PROJECTORS

BACKGROUND

One method of improving the resolution in front or rear projection systems is to periodically displace projected pixels from an intended original location a number of times per frame. For example, a pixel may be displaced upward to the right and left of the intended original location and downward to the right and left of the intended original location during a frame, thus enabling about four times as much image content to be displayed during the frame, thereby increasing resolution.

Typically, the pixels are displaced by either refracting a light beam through a refractive lens and onto a screen as the lens is periodically moved to different positions for front projectors or reflecting a light beam from a mirror and onto a screen as the mirror is periodically moved to different positions for rear projectors. One problem encountered when using this method is that disturbances from, e.g., an audio system integrated within the projection system or located externally of the projector or vibrations from other sources, such as home appliances, people walking in close proximity to the projector, etc., can resonantly couple with an assembly containing the movable mirror or refractive lens, e.g., through the air or chassis of the projection system or both. This acts to degrade the performance of the projection system, e.g., by blurring the projected image or by causing a jitter in the projected image.

DETAILED DESCRIPTION

In the following detailed description of the present embodiments, reference is made to the accompanying drawings that form a part hereof, and in which are shown by way of illustration specific embodiments that may be practiced. These embodiments are described in sufficient detail to enable those skilled in the art to practice disclosed subject matter, and it is to be understood that other embodiments may be utilized and that process, electrical or mechanical changes may be made without departing from the scope of the claimed subject matter. The following detailed description is, therefore, not to be taken in a limiting sense, and the scope of the claimed subject matter is defined only by the appended claims and equivalents thereof.

Figure 1:
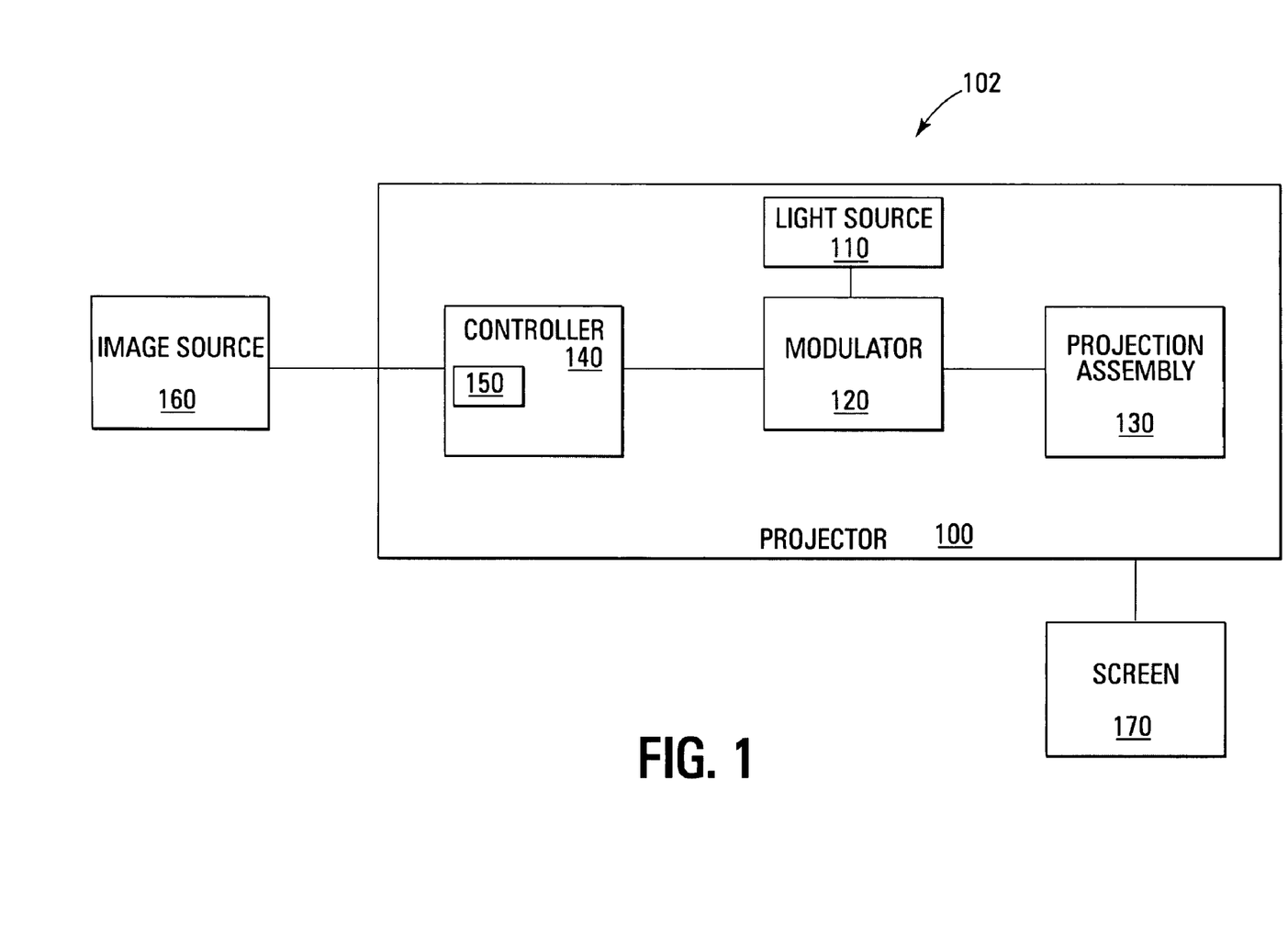
FIG. 1 is a block diagram of an embodiment of a projector, according to an embodiment of the invention.

FIG. 1 is a block diagram of a digital projector 100 e.g., as a portion of a rear or front projection system 102, such as a rear or front projection television, according to an embodiment. Digital projector 100 includes a light source 110, and a modulator 120 that may include pixilated MEMS devices, such as micro-mirrors, or interference-based modulators, LCD devices, such as Liquid Crystal on Silicon (LCOS) devices, etc., optically coupled to light source 110. A projection assembly 130 is also included. Projection assembly 130 includes at least a refractor, such as a transparent plate or a lens (not shown in FIG. 1) optically coupled to modulator 120 for front or rear projection embodiments or at least a mirror (not shown in FIG. 1) optically coupled to modulator 120 for front or rear projection embodiments. For some embodiments, projection assembly 130 may include a magnifying lens, color correction filter(s), etc., e.g., located between modulator 120 and either the refractor or mirror. For other embodiments, the magnifying lens may be located after the refractor or mirror. For one embodiment, the refractor or mirror may be located at a center of the magnifying lens.

Each micro-mirror of modulator 120 corresponds to a pixel of the array. Modulator 120 receives light from light source 110 and sends its pixel content, in the form an image, to projection assembly 130, which sends the image content of modulator 120 to a screen 170, that may be a front or rear projection screen. For another embodiment, modulator 120 may be pulse width modulated to achieve gray scale rendering. For one embodiment, a color wheel is included in the projection assembly 130 for rendering colors.

Projector 100 also includes a controller 140 for controlling the operation of modulator 120. For one embodiment, controller 140 controls the modulation of modulator 120. For another embodiment, controller 140 is adapted to perform methods in accordance with embodiments of the present disclosure in response to computer-readable instructions. These computer-readable instructions are stored on a computer-usable media 150 of controller 140 and may be in the form of software, firmware, or hardware. In a hardware solution, the instructions are hard coded as part of a processor, e.g., an application-specific integrated circuit (ASIC) chip, a field programmable gate array (FPGA), etc. In a software or firmware solution, the instructions are stored for retrieval by controller 140. Some additional examples of computer-usable media include static or dynamic random access memory (SRAM or DRAM), read-only memory (ROM), electrically-erasable programmable ROM (EEPROM or flash memory), magnetic media and optical media, whether permanent or removable. Controller 140 receives digital source data, for example, from an image source 160, such as a computer, DVD player, a set-top box connected to a direct television satellite link, cable television provider, etc.

Figure 2:
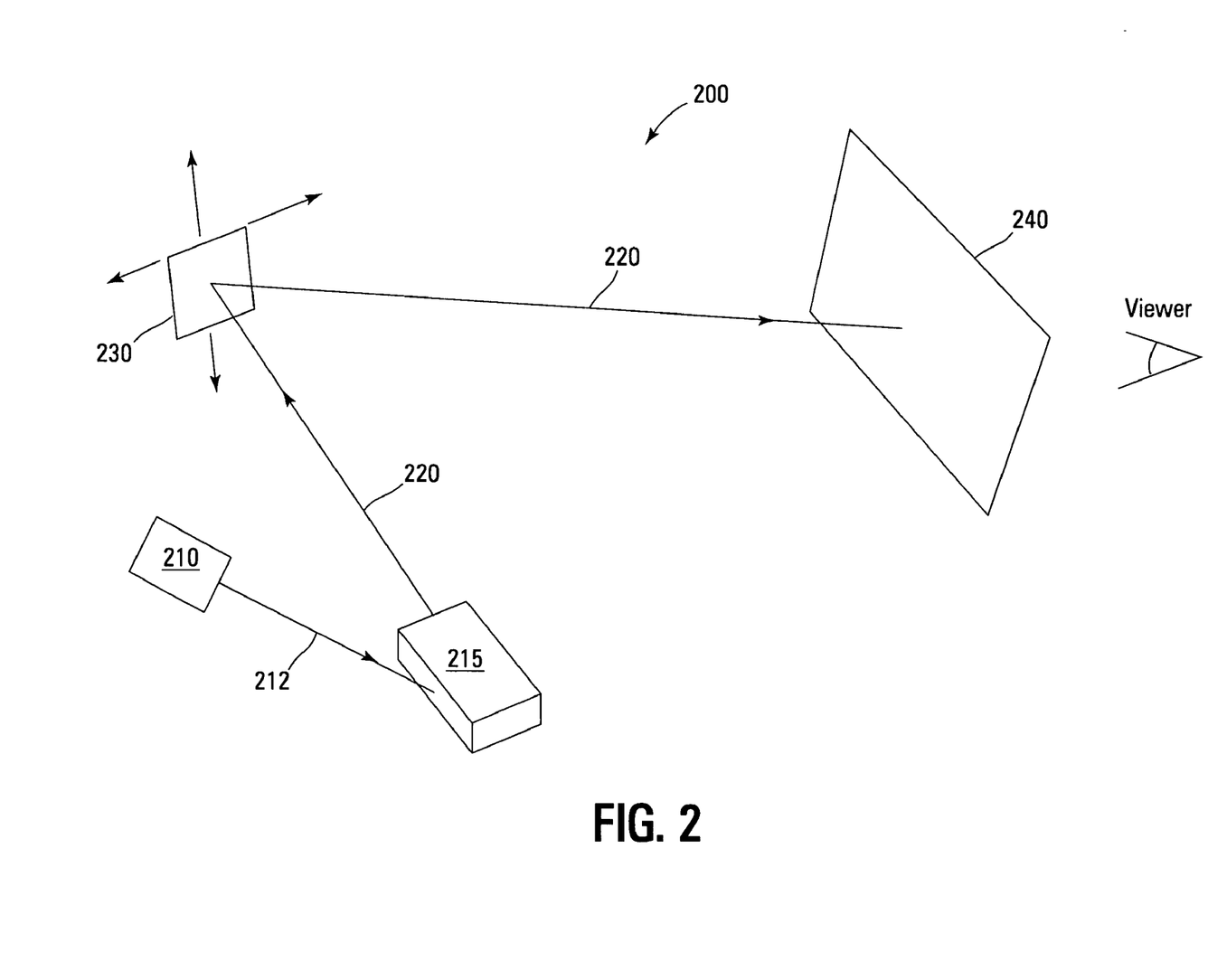
FIG. 2 illustrates a portion of an embodiment of a rear projection system, according to another embodiment of the invention.

FIG. 2 illustrates a portion of a rear projection system 200, according to an embodiment. For one embodiment, rear projection system 200 includes projector, such as projector 100 of FIG. 1. For another embodiment, rear projection system 200 includes a modulator 215 that reflects a light beam 212 from a light source 210 to form light beam 220, containing an image produced from pixels of modulator 215. Light beam 220 is reflected off a mirror 230 that may be a portion of a projection assembly, such as projection assembly 130 of FIG. 1. Mirror 230 reflects light 220 onto a screen 240 to produce an image. Note, for example, that a viewer would be located on the opposite side of screen 240 from where mirror 230 is located, as shown in FIG. 2. For one embodiment, mirror 230 is periodically moved, as indicated by the arrows adjacent mirror 230 in FIG. 2, as light 220 is reflected therefrom. Moving mirror 230 acts to displace the pixels displayed on the screen from their original locations established in the modulator 215.

Figure 3:
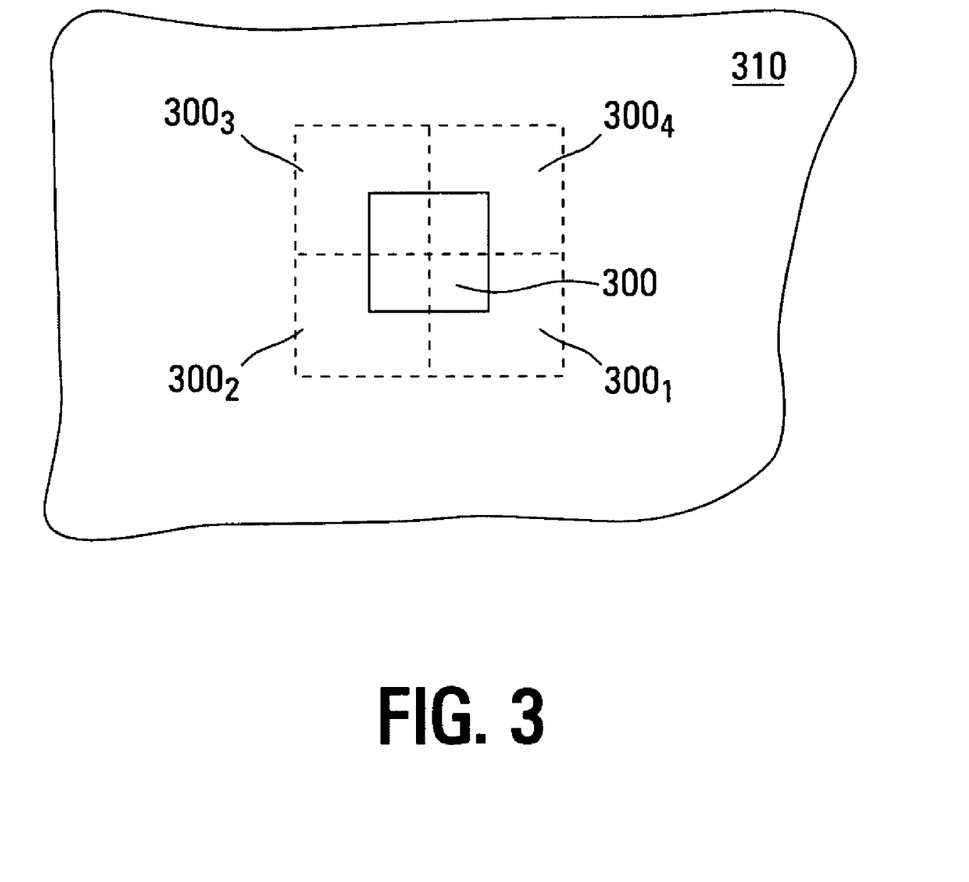
FIG. 3 illustrates a displacement of a pixel, according to an embodiment of the invention.

FIG. 3 illustrates the displacement of a pixel 300 as a portion of an array of pixels forming an image projected onto a screen 310, according to an embodiment. Pixel 300 is located at the original location established in a modulator, such as modulator 120 or modulator 215 respectively of FIGS. 1 and 2. Note that pixel 300 is not actually projected onto screen 310, but is included to illustrate where it would be located if mirror 230 was not moved. For one embodiment, each of the locations of pixel 300 occurs during a single image frame. Note that mirror 230 moves to respectively project pixels $300_1$-$300_4$ down and to the right, down and to the left, up and to the left, and up and to the right of the original location established in the modulator.

Figure 4:
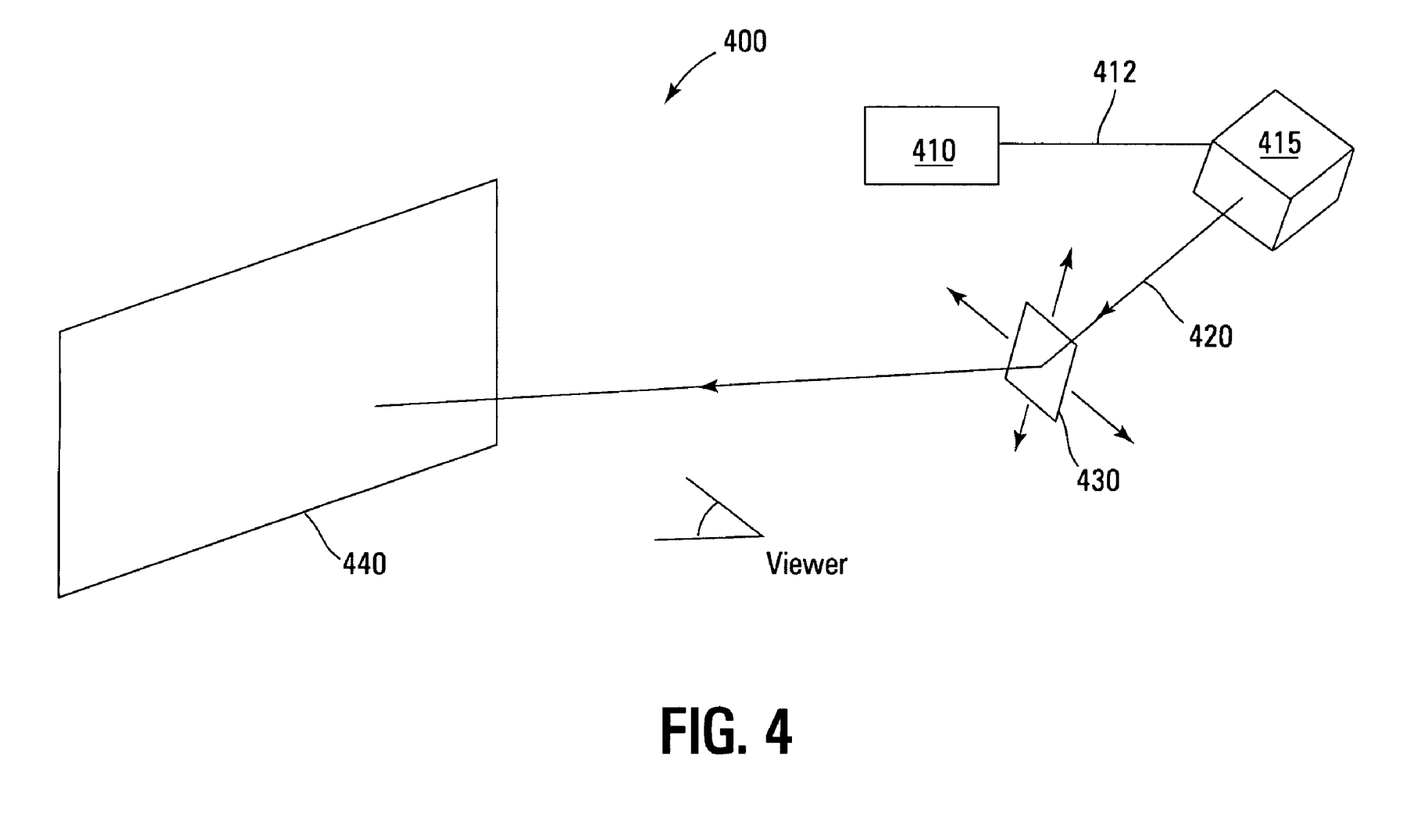
FIG. 4 illustrates a portion of an embodiment of a front projection system, according to another embodiment of the invention.

FIG. 4 illustrates a portion of a front projection system 400, according to another embodiment. For one embodiment, front projection system 400 includes a modulator 415 that reflects a light beam 412 from a light source 410 to form light beam 420, containing an image produced from pixels of modulator 415. Light beam 420 is directed to a refractor 430 that may be a portion of a projection assembly, such as projection assembly 130 of FIG. 1. In various embodiments, refractor 430 may be a transparent plate or a lens. Refractor 430 refracts light 420 onto a screen 440 to produce an image, e.g., a reflected image, since the viewer sits between 430 and 440, as shown in FIG. 4. However, the viewer can sit behind the projector. For one embodiment, refractor 430 is periodically moved, as indicated by the arrows adjacent refractor 430 in FIG. 4, as light 420 is refracted therethrough. Moving refractor 430 acts to displace the pixels from their original locations established in modulator 415, similar to that illustrated in FIG. 3 and discussed above for mirror 230. It should be noted the present disclosure is not limited to moving either mirror 230 or refractor 430 in four directions, as respectively shown in FIGS. 2 and 4, and thereby displaying the pixels of a given frame at four different locations during that frame, as shown in FIG. 3. Rather, mirror 230 or refractor 430 may be configured for displacing the pixels in two or more directions.

Figure 5:
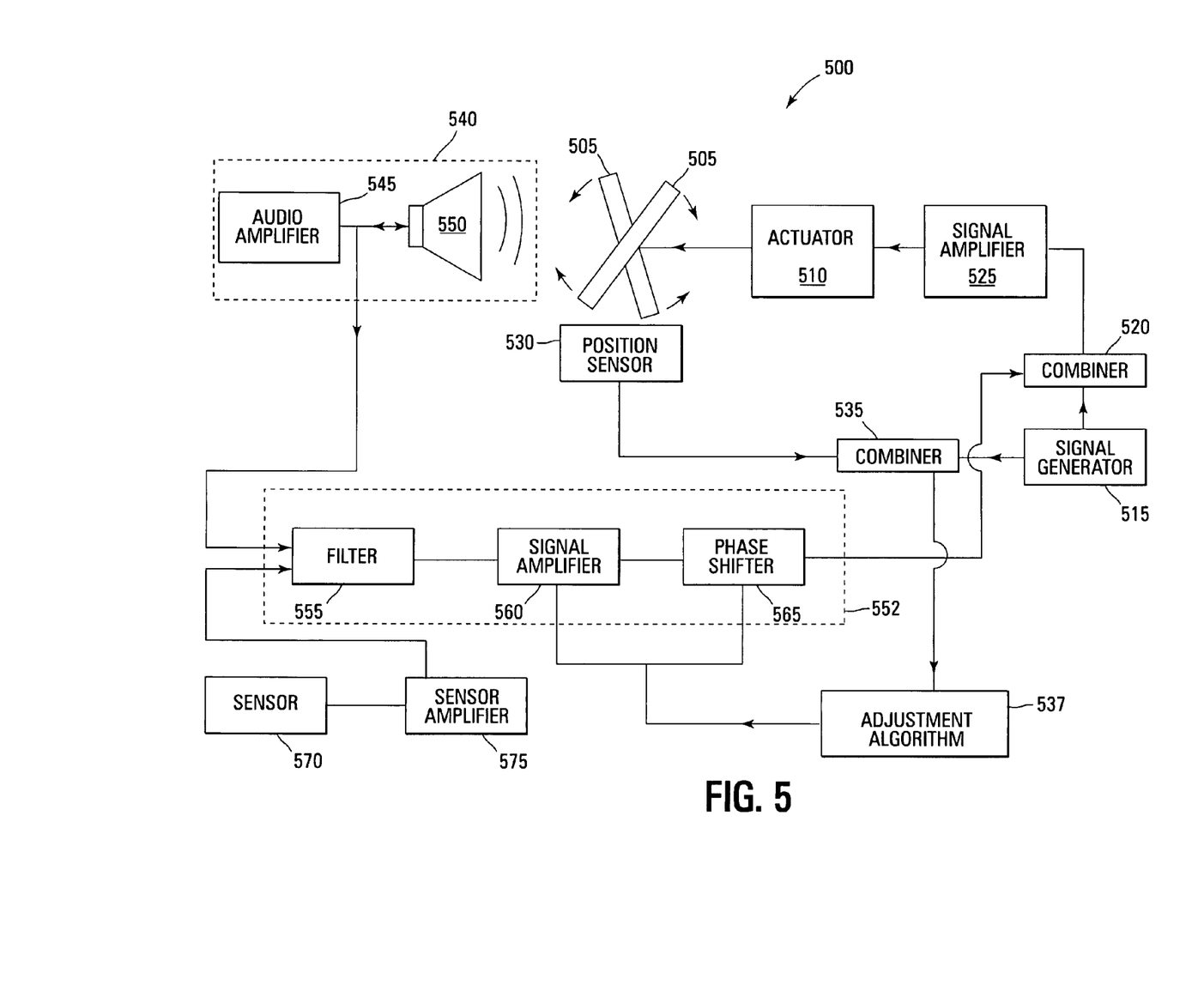
FIG. 5 is a block diagram illustrating a portion of an embodiment of a projection system, according to an embodiment of the invention.

FIG. 5 is a block diagram illustrating a portion of a projection system 500, e.g., a front or rear projection system, according to another embodiment. For one embodiment, projection system 500 includes a projector, such as projector 100 of FIG. 1, having a controller, such as controller 140 of FIG. 1, a projection assembly, such as projection assembly 130 of FIG. 1, etc. An optical component 505, such as a refractor or a mirror, can be moved (or actuated) using an actuator 510, such as an electromechanical actuator, e.g., a voice coil motor, a piezoelectric actuator, etc., mechanically coupled to optical component 505. For one embodiment, optical component 505 and actuator 510 constitute a portion of the projection assembly. For another embodiment, a signal generator 515, a signal combiner 520, such as a signal summing device, and a signal amplifier 525 are connected to each other and to actuator 510. For another embodiment, signal generator 515, signal combiner 520, and signal amplifier 525 form a portion of the controller.

For one embodiment, signal generator 515 generates a square wave that may oscillate between a positive and a negative voltage for driving actuator 510 and thus optical component 505. At the positive voltage, actuator 510 maintains optical component 505 at one of the positions, as shown in FIG. 5, and at the negative voltage, actuator 510 maintains optical component 505 at the other of the positions, as shown in FIG. 5. Alternatively, actuator 510 may be biased to keep optical component 505 in one of the positions shown, e.g., by a spring a bias voltage, etc., and the square wave may oscillate between zero volts and a positive or negative voltage, where at zero volts actuator 510 keeps optical component 505 at the biased position and at the positive or negative voltage actuator 510 moves optical component 505 to the other position. Note that projection system 500 is not limited to two-position optical devices 505 (e.g., having a single axis about which optical component 505 pivots), as shown in FIG. 5. Instead, projection system 500 may include, four-position optical devices (e.g., having two axes about which optical component 505 pivots), as illustrated in FIGS. 2 and 4; six position optical devices (e.g., having three axes about which optical component 505 pivots); etc.

For some embodiments, an optional sensor 530 may be located adjacent optical component 505 for determining its instantaneous position and sensing its motion. Sensor 530 is connected to an optional combiner 535, e.g., a portion of the controller for one embodiment, which is connected to signal generator 515. Suitable position sensors include, but are not limited to, piezoelectric sensors, optical sensors, capacitive sensors, Hall-effect sensors, accelerometers, etc. For other embodiments, signals are sent from combiner 535 to an optional adjustment algorithm block 537. For one embodiment, optional sensor 530, optional combiner 535, and optional adjustment algorithm block 537 are included for compensating for variations due to temperature, manufacturing, e.g., unit-to-unit variations, aging of parts, wearing out of parts, replacement by spare parts, etc.

For various embodiments, projection system 500 includes an audio system 540 that includes an audio amplifier 545 having an output connected to one or more speakers 550. For one embodiment, audio system 540 is contained within projection system 500, with speaker(s) 550 secured to a chassis of projection system 500. For another embodiment, speaker(s) 550 are located externally of projection system 500. The output audio amplifier 545 is also connected to a signal conditioner 552 that for one embodiment forms a portion of the controller. For some embodiments, signal conditioner 552 includes a filter 555, such as a band-pass filter or an adaptive band-pass filter, connected to a signal amplifier 560 that is connected to a phase shifter 565 that is connected to combiner 520. Phase shifter 565 may be either configured to shift a phase of an incoming signal by a fixed amount or configured to vary the phase of an incoming signal. For one embodiment, phase shifter 565 may shift the phase of the incoming by up to a half a cycle or more than a half a cycle. For another embodiment, signal amplifier 560 may have a gain that is greater than one for increasing the amplitudes of signals received thereat or less than one for reducing the amplitudes of signals received thereat or a gain that is one. For other embodiments, signal amplifier 560 may have an adjustable (or variable gain). For one embodiment, signal amplifier 560 and phase shifter 565 respectively adjust the gain and phase of a signal in response to commands from adjustment algorithm block 537.

For another embodiment, projection system 500 may include an optional sensor 570, such as a microphone a vibration sensor, or the like, for detecting non-soundtrack disturbances, such as sounds or vibrations, generated exteriorly of projection device 500, such as from household appliances, people walking in close proximity to projection system 500, etc. Sensor 570 is connected to a sensor amplifier 575 that is connected to filter 555.

Note that during operation of projection system 500, one or more unwanted oscillatory forces generated externally of optical component 505 and/or actuator 510 act to displace optical component 505. These oscillatory forces are generated by disturbances external to optical component 505 and actuator 510, such as may be generated by speaker(s) 550 and/or various non-soundtrack system sources, and may have low oscillation frequencies, e.g., such as corresponding to bass frequencies output by speaker(s) 550. The oscillatory forces may resonantly couple with optical component 505 and/or actuator 510 directly or via the chassis of projection system 500, displacing optical component 505 at one or more frequencies. Note that the frequencies of the oscillation forces may include the resonant frequency (or fundamental frequency) of optical component 505 and/or actuator 510 and harmonics and sub-harmonics of the resonant frequency. For one embodiment, the frequency, amplitude, and phase of the oscillatory displacements of optical component 505 are predetermined for various projection systems using sensors, e.g., position sensors, such as sensor 530 of FIG. 5. A signal 610 of FIG. 6 represents an exemplary oscillatory displacement of optical component 505 and/or actuator 510 that includes an unwanted oscillatory component caused by audio system 540 or a non-audio-system disturbance riding on the desired square wave.

In operation, for one embodiment, signal generator 515 generates a driving square wave signal, e.g., about 60 Hz, as indicated above for driving actuator 510 and thus optical component 505. Signals are received at filter 555 from audio amplifier 545 or audio sensor amplifier 575 or both. The signals received at filter 555 contain one or more frequency components that either act to produce the unwanted oscillatory displacements of optical component 505 via speaker(s) 550 and/or are the result of non-audio-component sources, sensed by sensor 570.

For one embodiment, filter 555 is selected or adjusted to pass one or more components of the signals received thereat having frequencies corresponding to a predetermined resonant frequency of the optical chassis, optical assembly, etc., e.g., about 100 to about 300 Hz, of optical component 505 and/or actuator 510 and/or harmonics and sub-harmonics of the resonant frequency. Signal amplifier 560 sets the amplitudes of the one or more components to be substantially equal to the predetermined amplitudes of the unwanted oscillatory displacements, e.g., the amplitude of the unwanted oscillatory displacement riding on the square wave of signal 610. Phase shifter 565 sets the phase of the one or more components to be substantially equal to the predetermined phases of the unwanted oscillatory displacements, e.g., the phase of the unwanted oscillatory displacement riding on the square wave of signal 610. Signal 620 of FIG. 6 is an exemplary output of signal conditioner 552, resulting from conditioning a single unwanted oscillatory displacement. Combiner 520 combines the one or more components so conditioned by signal conditioner 552, e.g., signal 620, and the driving square signal from signal generator 515, e.g., by subtracting the one or more conditioned components from the driving square wave signal from signal generator 515 to form, for example, modified drive signal 630 of FIG. 6, produced by subtracting signal 620 from the driving square wave signal from signal generator 515.

Figure 6:
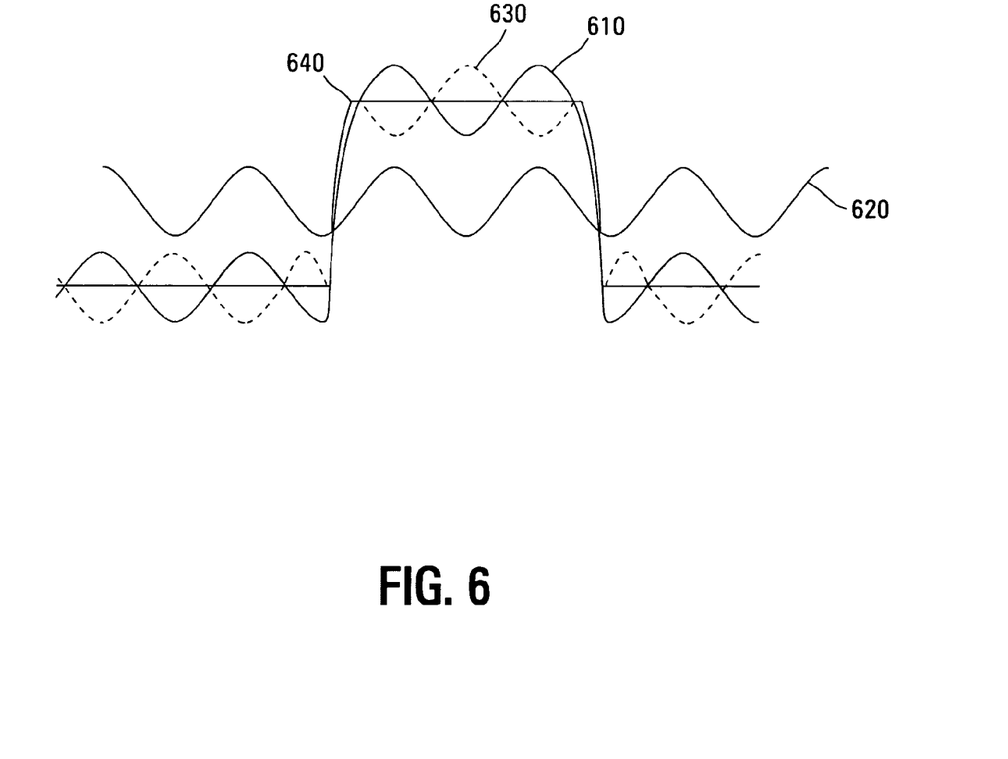
FIG. 6 illustrates signals, according to another embodiment of the invention.

Note that modified drive signal 630 is the result of receiving signals from audio amplifier 545 or audio sensor amplifier 575 or both at filter 555, passing a component of the signals having substantially the same frequency as an unwanted oscillatory displacement to signal amplifier 560, setting the amplitude of the component to be substantially the same the amplitude of the unwanted oscillatory displacement at signal amplifier 560, and shifting the phase of the component to have substantially the same phase as the unwanted oscillatory displacement at phase shifter 565, to produce signal 620 of FIG. 6. Signal 620 is then subtracted from the driving square wave signal from signal generator 515 at combiner 520. Note further that more than one conditioned frequency component from signal conditioner 552 may be subtracted from the driving square wave signal from signal generator 515 for producing a modified drive signal.

The modified drive signal, e.g., modified drive signal 630, is then amplified at signal amplifier 525 and is used to drive actuator 510 and thus optical component 505. The one or more components subtracted from the driving square wave signal from signal generator 515 act to substantially cancel the unwanted oscillatory displacements of optical component 505 that are produced by the unwanted oscillatory forces generated externally of optical component 505 and drive actuator 510. For one embodiment the amplification at signal amplifier 525 is coordinated with signal amplifier 560 so that unwanted oscillatory displacements of optical component 505 are effectively canceled. Note that a signal representative of the more idealized motion of optical component 505 is exemplified by signal 640 of FIG. 6 for a single oscillatory displacement signal 610.

Optionally, for one embodiment, sensor 530 senses the motion of optical component 505 and sends a signal representative of the motion of optical component 505 to combiner 535. Combiner 535 subtracts the driving square wave signal from signal generator 515 received thereat from the signal representative of the motion of optical component 505. This produces an error signal that includes the error between signal representative of the motion of optical component 505 and the driving square wave signal that may be due to the variations discussed above in the unwanted oscillatory displacements of optical component 505 and/or actuator 510. Note that the driving square wave signal represents an ideal motion of optical component 505. The error signal is then sent to adjustment algorithm block 537. The error signal is analyzed at adjustment algorithm block 537, e.g., using a least squares or other procedure, to determine a gain and phase for reducing the error between driving square wave signal and signal representative of the motion of optical component 505. Note that the procedure using sensor 530 is applicable with or without using a predetermined unwanted oscillatory displacement. For another embodiment, a user may be prompted, e.g., by a Graphical User Interface, to adjust the phase and gain of signal 620.

CONCLUSION

Although specific embodiments have been illustrated and described herein it is manifestly intended that the scope of the claimed subject matter be limited only by the following claims and equivalents thereof.

What is claimed is:

1. A method of operating a projector, comprising:
   generating an oscillatory driving signal that contains one or more components that act to substantially cancel one or more unwanted oscillatory displacements of an optical component of the projector resulting from one or more unwanted oscillatory forces;
   driving an actuator of the projector that is coupled to the optical component with the oscillatory driving signal; and
   using the actuator to oscillate the optical component between two or more operative positions according to oscillations of the oscillatory driving signal.

2. The method of claim 1, wherein at least one of the one or more components of the driving signal has a frequency substantially equal to a resonant frequency of the optical component or a sub-harmonic or harmonic of the resonant frequency.

3. The method of claim 1 further comprises generating the driving signal using a method comprising:
- conditioning a signal that acts to produce or is the result of one or more disturbances that act to produce at least one of the one or more unwanted oscillatory forces; and
- subtracting the conditioned signal from a signal that represents an ideal motion of the optical component, thereby forming at least one of the one or more components that act to substantially cancel the one or more unwanted oscillatory displacements of the optical component.

4. The method of claim 3, wherein the signal that acts to produce or is the result of one or more disturbances that act to produce at least one of the one or more unwanted oscillatory forces is a first signal and wherein conditioning the first signal comprises setting an amplitude of the first signal to be substantially equal to an amplitude of at least one of the one or more unwanted oscillatory displacements.

5. The method of claim 4, wherein conditioning the first signal further comprises setting a phase of the first signal to be substantially equal to a phase of at least one of the unwanted oscillatory displacements.

6. The method of claim 1 further comprises:
- monitoring an actual motion of the optical component;
- subtracting a signal representative of an ideal motion of the optical component from a signal representative of the actual motion of the optical component that is obtained from monitoring the actual motion of the optical component to form an error signal; and
- forming at least one of the one or more components that act to substantially cancel the one or more unwanted oscillatory displacements of the optical component based on the error signal.

7. The method of claim 6, wherein forming at least one of the one or more components that act to substantially cancel the one or more unwanted oscillatory displacements of the optical component from the error signal comprises setting an amplitude or a phase of a signal or both that acts to produce or is the result of at least one or more disturbances that act to produce at least one of the one or more unwanted oscillatory forces using the error signal.

8. The method of claim 1, wherein the optical component is a mirror or a refractor.

9. The method of claim 1, wherein the projector is a front or rear projector.

10. A method of operating a projection system, comprising:
- conditioning a first signal that acts to produce or is the result of one or more disturbances that act to produce one or more unwanted oscillatory forces that act to cause one or more unwanted oscillatory displacements of an optical component of the projection system;
- subtracting the conditioned first signal from a second signal that represents an ideal motion of the optical component to form a third signal; and
- driving the optical component using the third signal so that the one or more unwanted oscillatory displacements of the optical component are substantially cancelled;
- wherein driving the optical component using the third signal comprises oscillating the optical component between two or more operative positions according to oscillations of the third signal.

11. The method of claim 10, wherein the first signal drives audio speakers of the projection system.

12. The method of claim 10, wherein conditioning the first signal comprises:

- adjusting an amplitude of at least one component of the first signal having substantially the same frequency as at least one of the one or more unwanted oscillatory displacements of the optical component to be substantially equal to an amplitude of at least one of the one or more unwanted oscillatory displacements; and
- adjusting a phase of the at least one component of the first signal having substantially the same frequency as at least one of the one or more unwanted oscillatory displacements of the optical component to be substantially equal to a phase of the at least one of the unwanted oscillatory displacements.

13. The method of claim 10, wherein conditioning the first signal comprises:
- monitoring an actual motion of the optical component;
- subtracting a signal representative of an ideal motion of the optical component from a signal representative of the actual motion of the optical component that is obtained from monitoring the actual motion of the optical component to form an error signal;
- adjusting an amplitude of at least one component of the first signal having substantially the same frequency as at least one of the one or more unwanted oscillatory displacements of the optical component based on the error signal; and
- adjusting a phase of the at least one component of the first signal having substantially the same frequency as at least one of the one or more unwanted oscillatory displacements of the optical component based on the error signal.

14. A computer-usable medium containing computer-readable instructions for causing a projector to perform a method, comprising:
- generating an oscillatory driving signal that contains one or more components that act to substantially cancel one or more unwanted oscillatory displacements of an optical component of the projector resulting from one or more unwanted oscillatory forces;
- driving an actuator of the projector that is coupled to the optical component with the oscillatory driving signal; and
- using the actuator to oscillate the optical component between two or more operative positions according to oscillations of the oscillatory driving signal.

15. The computer-usable medium of claim 14, wherein, in the method, at least one of the one or more components of the driving signal has a frequency substantially equal to a resonant frequency of the optical component or a sub-harmonic or harmonic of the resonant frequency.

16. The computer-usable medium of claim 14, wherein the method further comprises generating the driving signal using a method comprising:
- conditioning a signal that acts to produce or is the result of one or more disturbances that act to produce at least one of the one or more unwanted oscillatory forces; and
- subtracting the conditioned signal from a signal that represents an ideal motion of the optical component, thereby forming at least one of the one or more components that act to substantially cancel the one or more unwanted oscillatory displacements of the optical component.

17. The computer-usable medium of claim 16, wherein, in the method, the signal that acts to produce or is the result of one or more disturbances that act to produce at least one of the one or more unwanted oscillatory forces is a first signal and wherein conditioning the first signal comprises setting an amplitude of the first signal to be substantially equal to an amplitude of at least one of the one or more unwanted oscillatory displacements.

18. The computer-usable medium of claim 17, wherein, in the method, conditioning the first signal further comprises setting a phase of the first signal to be substantially equal to a phase of at least one of the unwanted oscillatory displacements.

19. The computer-usable medium of claim 14, wherein the method further comprises:
   monitoring an actual motion of the optical component;
   subtracting a signal representative of an ideal motion of the optical component from a signal representative of the actual motion of the optical component that is obtained from monitoring the actual motion of the optical component to form an error signal; and
   forming at least one of the one or more components that act to substantially cancel the one or more unwanted oscillatory displacements of the optical component based on the error signal.

20. The computer-usable medium of claim 19, wherein, in the method, forming at least one of the one or more components that act to substantially cancel the one or more unwanted oscillatory displacements of the optical component from the error signal comprises setting an amplitude or a phase or both of a signal that acts to produce or is the result of at least one or more disturbances that act to produce at least one of the one or more unwanted oscillatory forces using the error signal.

21. A projector comprising:
   means for conditioning a first signal that acts to produce or is the result of at least one or more disturbances that act to produce at least one of one or more unwanted oscillatory forces that result in one or more unwanted oscillatory displacements of an optical component or the projector;
   means for subtracting the conditioned first signal from a second signal that represents an ideal motion of the optical component to form a third signal; and
   means for driving the optical component using the third signal so that one or more of the unwanted oscillatory displacements of the optical component are substantially cancelled;
   wherein driving the optical component using the third signal comprises oscillating the optical component between two or more operative positions according to oscillations of the third signal.

22. The projector of claim 21, wherein the first signal conditioning means comprises:
   means for adjusting an amplitude of at least one component of the first signal having substantially the same frequency as at least one of the one or more unwanted oscillatory displacements of the optical component to be substantially equal to an amplitude of at least one of the one or more unwanted oscillatory displacements; and
   means for adjusting a phase of the at least one component of the first signal having substantially the same frequency as at least one of the one or more unwanted oscillatory displacements of the optical component to be substantially equal to a phase of the at least one of the unwanted oscillatory displacements.

23. The projector of claim 21, wherein the first signal conditioning means comprises:
   means for monitoring an actual motion of the optical component;
   means for subtracting the second signal from a signal representative of the actual motion of the optical component that is obtained from monitoring the actual motion of the optical component to form an error signal;
   means for adjusting an amplitude of at least one component of the first signal having substantially the same frequency as at least one of the one or more unwanted oscillatory displacements of the optical component based on the error signal; and
   means for adjusting a phase of the at least one component of the first signal having substantially the same frequency as at least one of the one or more unwanted oscillatory displacements of the optical component based on the error signal.

24. A projection system comprising:
   an actuator;
   an optical component mechanically coupled to the actuator;
   a signal conditioner having an input connected to an output of an audio system or an output of an audio sensor or both, the signal conditioner having an output connected to a first input of a combiner having an output connected to an input of the actuator; and
   a signal generator having output connected a second input of the combiner;
   wherein the signal conditioner is configured to produce a conditioned signal by conditioning a signal from the audio system or the sensor that acts to produce or is the result of one or more disturbances that act to produce one or more unwanted oscillatory forces that act to cause one or more unwanted oscillatory displacements of the optical component;
   wherein the combiner is configured to combine the conditioned signal with a signal from the signal generator that represents an ideal motion of the optical component to form an oscillatory driving signal that contains one or more components that act to substantially cancel the one or more unwanted oscillatory displacements of the optical component; and
   wherein the actuator is configured to receive the oscillatory driving signal from the combiner and to oscillate the optical component between two or more operative positions according to oscillations of the oscillatory driving signal.

25. The projection system of claim 24, wherein the audio system comprises an audio amplifier having an output electrically connected to one or more speakers.

26. The projection system of claim 25, wherein the output of audio amplifier also serves as the output of the audio system that connects the audio system to an input of a filter of the signal conditioner that serves as the input of the signal conditioner.

27. The projection system of claim 26, wherein the signal conditioner further comprises a signal amplifier connected to an output of the filter and a phase shifter connected to an output of the signal amplifier, wherein an output of the phase shifter serves as the output of the signal conditioner connected to the first input of the combiner.

28. The projection system of claim 24 wherein the projection system is a front or rear projection system.

29. An apparatus comprising:
   a filter configured to be electrically connected to an output of an audio amplifier of a projection system;
   a signal amplifier having an input connected to an output of the filter;
   a phase shifter having an input connected to an output of the signal amplifier;
   a combiner having a first input connected to an output of the phase shifter and a second input connectable to a signal generator of the projection system and an output connectable to an actuator of the projection system for driving an optical component of the projection system;

wherein the filter is configured to pass at least one component of a signal received from the audio amplifier having a frequency substantially equal to a frequency of at least one unwanted oscillatory displacement of the optical component resulting from at least one unwanted oscillatory force;

wherein the signal amplifier is configured to set an amplitude of the at least one component received from the filter to be substantially equal to an amplitude of the at least one unwanted oscillatory displacement;

wherein the phase shifter is configured to set a phase of the at least one component received from the signal amplifier to be substantially equal to a phase of the at least one unwanted oscillatory displacement; and wherein the combiner is configured to subtract the at least one component received from the from phase shifter from a signal received from the signal generator and to output the resulting signal to the actuator.

30. The apparatus of claim 29 further comprises:

a position sensor configured to sense the motion of the optical component;

a second combiner having a first input connected to an output of the position sensor and a second input connectable to a second output of the signal generator; and an adjustment algorithm block having an input connected to an output of the second combiner and configured to control the signal amplifier and the phase shifter.

31. The apparatus of claim 29, wherein the filter is a band-pass filter or an adaptive band-pass filter.

* * * * *

UNITED STATES PATENT AND TRADEMARK OFFICE
CERTIFICATE OF CORRECTION

PATENT NO.         : 7,494,226 B2
APPLICATION NO.    : 11/231455
DATED              : February 24, 2009
INVENTOR(S)        : Ted W. Barnes et al.

It is certified that error appears in the above-identified patent and that said Letters Patent is hereby corrected as shown below:

In column 10, line 22, in Claim 24, after "connected" delete "a" and insert -- to a --, therefor.

In column 12, line 2, in Claim 29, delete "from the from" and insert -- from the --, therefor.

Signed and Sealed this

Second Day of June, 2009

JOHN DOLL
*Acting Director of the United States Patent and Trademark Office*